United States Patent [19]
Larsen et al.

[11] Patent Number: 5,547,153
[45] Date of Patent: Aug. 20, 1996

[54] PROTECTOR FOR A HOSE AND A HOSE PROVIDED WITH SUCH PROTECTOR

[75] Inventors: Jarl F. Larsen; Flemming Larsen, both of Strandby, Denmark

[73] Assignee: Ole Bjerre, Vestbjerg, Denmark

[21] Appl. No.: 284,555

[22] PCT Filed: Feb. 12, 1993

[86] PCT No.: PCT/DK93/00048

§ 371 Date: Oct. 12, 1994

§ 102(e) Date: Oct. 12, 1994

[87] PCT Pub. No.: WO93/16314

PCT Pub. Date: Aug. 19, 1993

[30]     Foreign Application Priority Data

Feb. 14, 1992 [DK] Denmark .................. 0194/92

[51] Int. Cl.$^6$ ..................................................... A47F 5/00
[52] U.S. Cl. ..................................................... 248/76
[58] Field of Search ............................ 248/49, 76, 75, 248/80; 137/343

[56]         References Cited

U.S. PATENT DOCUMENTS

| | | | |
|---|---|---|---|
| 732,582 | 6/1903 | McKay | 248/76 X |
| 1,372,629 | 3/1921 | Osley . | |
| 1,977,775 | 10/1934 | Patterson | 137/90 |
| 2,837,120 | 6/1958 | Galloway | 248/76 X |
| 2,859,007 | 11/1958 | Cooke | 248/75 |
| 3,572,622 | 3/1971 | Smith | 248/49 |
| 3,734,138 | 5/1973 | Brown et al. | 138/106 |
| 3,809,348 | 5/1974 | Di Laura | 248/49 |
| 4,169,571 | 10/1979 | Duggan | 248/49 |
| 4,470,177 | 9/1984 | Ganung et al. | 248/76 X |
| 4,559,974 | 12/1985 | Fawley | 138/172 |
| 4,624,429 | 11/1986 | Miyazaki | 248/56 |
| 4,700,752 | 10/1987 | Fawley | 138/172 |
| 5,000,405 | 3/1991 | Rybak et al. | 248/80 |
| 5,158,254 | 10/1992 | Remby | 248/76 |
| 5,311,909 | 5/1994 | Adcock | 248/76 X |

*Primary Examiner*—Alvin C. Chin-Shue
*Assistant Examiner*—Sarah L. Purol
*Attorney, Agent, or Firm*—Watson Cole Stevens Davis, P.L.L.C.

[57]          ABSTRACT

A hose protector for placement around a hose to reduce friction and wear on the hose, a plurality of such protectors being placed at uniform intervals along the length of the hose, includes a solid annular body defining an interior surface which extends from a first end of the body to its second end, the interior surface having a diameter at the first and second ends of the body to sealingly engage with a hose extended through the body. The body defines an exterior surface which gradually expands in a first portion from the first end to a second portion of greatest diameter, and it includes a third portion which gradually contracts from the second portion to the second end of the body.

7 Claims, 2 Drawing Sheets

PROTECTOR FOR A HOSE AND A HOSE PROVIDED WITH SUCH PROTECTOR

BACKGROUND OF THE INVENTION

The present invention relates to a protector for a hose for placing at even intervals around a hose having a length and an outer diameter along the length thereof in order to reduce friction and wear, and provided in the form of a solid annular member which is mounted firmly around the hose and has an inner circumference with a diameter corresponding to the outer diameter of the hose, and which has a central portion having a greatest diameter and two end portions having an evenly declining diameter which at each end declines to the outer diameter of the hose.

U.S. Pat. No. 1,372,629 discloses a hose protector which is intended for reducing the friction and the wear on the hoses in large vacuum cleaner systems. With due regard thereto, hose protectors are placed with mutual distances in the form of annular members which are tubular and which encircle the hose to be protected. Furthermore, the hose protectors include an anchorage band which is connected to an end of the tubular member and which is fastened around the hose in order to prevent displacement of the tubular protecting members. Such a construction is difficult to use in buildings or in areas where the base is uneven as there will be a great risk of the hose being caught on the hose protectors. Furthermore, the hose protectors described will not be suited for use within the food industry because of the risk of bacterial growth in the tubular hose protectors.

From British Patent No. 1,327,659 and FR 2,656,405 hose protectors of the above-mentioned type are known which remedy a part of the above-mentioned drawbacks. The patents disclose the method of using annular solid rings of synthetic material as hose protectors.

The hose protectors of FR 2,656,405 have the further drawback that the choice of material for the protectors and the tube to which they are to be applied is very much dependent of each other due to the fact that the protectors are applied by a chemical and thermodynamic engagement.

Such a construction is still difficult to use in buildings or in areas where the base is uneven as there will be a great risk of the hose being caught on the edged hose protectors. Furthermore, the hose protectors described will not be suited for use within the food industry because the of risk of bacterial growth in the slot-shaped spaces between the hose and the hose protectors used.

SUMMARY OF THE INVENTION

Within the food industry, e.g. bakeries, butchers, slaughterhouses, the fishing industry, and the ice-cream industry, wear on the wash down hoses will be a large problem as such hoses have to be discarded due to the risk of bacterial growth. When an outer protecting layer on a wash down hose is thoroughly worn, and a wire reinforcement is cleared, it is thereby necessary to discard the hose.

It is the object of the present invention to provide a hose protector of the above-mentioned type, with which it is possible to remedy the above-mentioned drawbacks, and which hose protector also is suitable within the food industry.

According to the present invention this object is obtained with a hose protector, which is characterized in that the annular member is a separate element arranged for mounting around the hose, that at least the outermost edges of the end portions of the annular member are in sealing engagement against the outer side of the hose, and that the engagement is a frictional engagement between the inner circumference of the protector and the outer surface of the hose at least at the outermost edges of the end portions.

With a hose protector made in this way, the two evenly declining end portions will ensure that the hose protectors slide over doorsteps, rails, and other unevenness on the base upon which the hose is placed. Thus, there will be no risk of the hose being caught on the base or being difficult to pull across the base.

The hose protector according to the invention is especially advantageous within the food industry as the outermost edges of the end portions are in sealing engagement with the outer side of the hose. Accordingly, the risk is avoided that material penetrates in between the hose and the hose protectors, resulting in bacterial growth. Furthermore, the sealing abutment is a contributory cause that the hose protectors will have very little risk of being caught on doorsteps and the like, which are projecting from the base.

As the annular member constituting the hose protector is solid, it will not give the possibility of bacterial growth even if wear occurs. Therefore, the hose protectors may be exposed to a relatively great wear during movement across the base, without the necessity of replacing the hose. Thus, the hose does not need to be replaced even if it is used within the food industry, in which there are strict requirements for avoiding bacterial growth.

The hose protector is preferably made as a barrel-shaped member with a cylindrical central portion and two truncated cone-shaped end portions. However, the hose protector may also be made of two truncated cone-shaped members. In order to have a greater supporting surface on the individual hose protectors, and thereby less wear, it is, however, preferred to use barrel-shaped hose protectors. It is noted that the outer generatrices for the hose protectors may have any form. Accordingly, they may be rectilinear, concave, or convex. Furthermore, it is preferred to make the hose protectors with a strong, conspicuous colour. Hereby, the risks of the hoses being run over and people falling over the hoses are reduced.

The invention also relates to a hose, preferably a water hose, which is provided with hose protectors as described above, and being characterized in that the hose has such a stiffness, and is provided with such a number of hose protectors that the deflection of the hose between two subsequent hose protectors is less than half of the difference between the outer diameter of the hose protectors and the hose.

With such a hose no contact between the hose and the base will occur on any place between the hose protectors. Accordingly, the risk of wear, and thereby the risk of the wire reinforcement being cleared, is minimized, which makes the hose especially suitable within the food industry.

A hose according to the invention may be made of a hose, which with even intervals, is provided with friction reducing and wear reducing hose protectors, which are moulded around the hose.

This method makes it possible not only to obtain a quick and effective production of hoses provided with hose protectors, but also to obtain an effective method for establishing the tight connection between the hose and the hose protector. The moulding may take place around a hose made in advance or during the making of a hose. The hose is gradually led through a mould, in which it is provided with hose protectors, which are close-fitting and wedge around the hose, after the moulded plastic material is solidified and cooled.

It is noted that the hose alternatively may be made by wedging and locking two identical halves together around the hose. The two halves may optionally be provided with locking means or are assembled by welding, e.g. by ultrasound, which in itself is well-known for plastic welding. Such a production method may primarily be used in connection with hoses where requirements of purity are not as strict as within the food industry, but where it is desired to derive advantage of the hose protectors by lifting the hoses above the floor. Thus, this may be the case in car washes, on washing places, in swimming baths, on car decks, or other decks, and places of a similar kind.

The hose protectors will reduce the friction no matter what base is in question. If the base is wet, e.g. because of washing down or rain, such amounts of water will also prevent a free moving of a traditional hose across the base. By using traditional hoses, such amounts of water will be prevented from flowing freely into a sewer. The use of hose protectors makes it possible to lift the hose from the base in such a way that the water may flow freely to a sewer. Hereby, the handling of the hose is made substantially easier, and hereby it is avoided to overcome the resistance from the large amounts of water when the hose is pulled across the base.

BRIEF DESCRIPTION OF THE DRAWING.

The invention will now be further explained with reference to the accompanying drawings, wherein.

Figure 4:
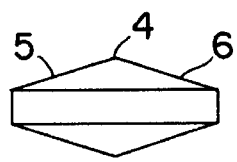
Figure 5:
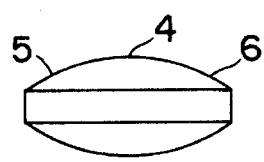
Figure 6:
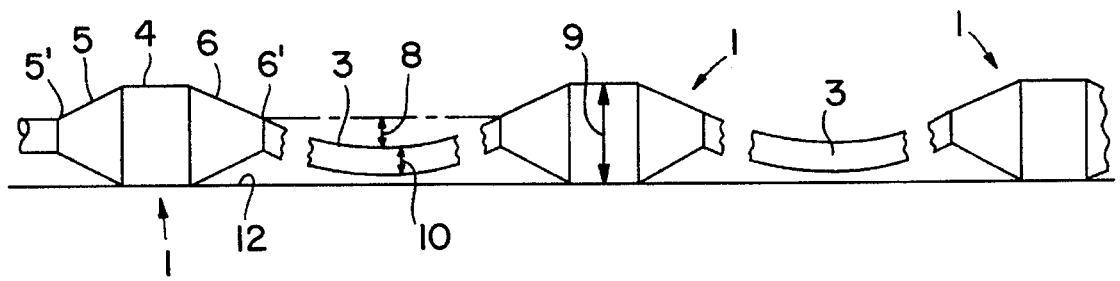
FIG. 6 shows a partial and schematic view for illustrating a hose according to the invention.

In all of the embodiments illustrated in FIGS. 1–5 a hose protector 1 comprises a central passage 2 for receiving a hose 3 (See FIG. 6). The hose protectors comprise a central portion 4 and two end portions 5,6 placed at each side of the central portion 4.

All of the embodiments are made of solid plastic which may be chosen among different forms of plastic as long as this has sufficient hardness.

Figure 1:
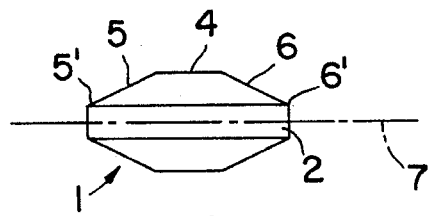
FIGS. 1–5 illustrate schematic sections through different embodiments for a hose protector according to the invention.
Figure 2:
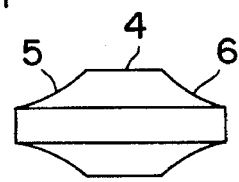
Figure 3:
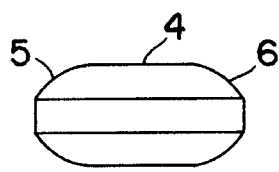

In FIGS. 1–3 hose protectors 1 are illustrated having a barrel-shaped appearance. In each of these embodiments the central portion 4 is constituted by a substantially cylindrical portion, and the end portions 5,6 are substantially truncated cone-shaped. In FIG. 1 the outer generatrix for the truncated cone-shaped end portions 5,6 is rectilinear. In FIG. 2 the outer generatrix for the truncated cone-shaped end portions 5,6 is concave, while in FIG. 3 it is convex.

In FIG. 4 an embodiment is shown, in which the central portion 4 is constituted by quite a small area, where two truncated cone-shaped end portions 5,6 meet each other. In FIG. 5 an embodiment is shown, in which the central portion 4 and the end portions 5,6 overlap each other in a curvature, which substantially corresponds to an ellipse.

In each of the embodiments described above, the generatrix for the outer side of the two end portions will form an angle together with a central axis 7 for a central axis through the central passage 2 of the hose protector, which angle is of between approximately 10° and 45°. Hereby, the risk of the hose protectors being caught on portions in the base is avoided. In order to avoid the risk of people falling over the hoses or the hoses being run over, the hose protectors are made with a strong, conspicuous colour. The hose 3 shown in FIG. 6 is provided with hose protectors 1 of the type shown in FIG. 1. The hose 3 is made with such a stiffness, and the mutual distance between subsequent hose protectors 1 is chosen so small, that the outward deflection 8 of the hose between two subsequent hose protectors 1 is less than half of the difference between the outer diameter 9 of the hose protector, and the outer diameter 10 of the hose. Accordingly, the outward deflection 8 between two subsequent hose protectors 1 will be so small that the bottom side 11 of the hose at this point will be free of a base 12, upon which the hose protectors 1 rest.

Figure 7:
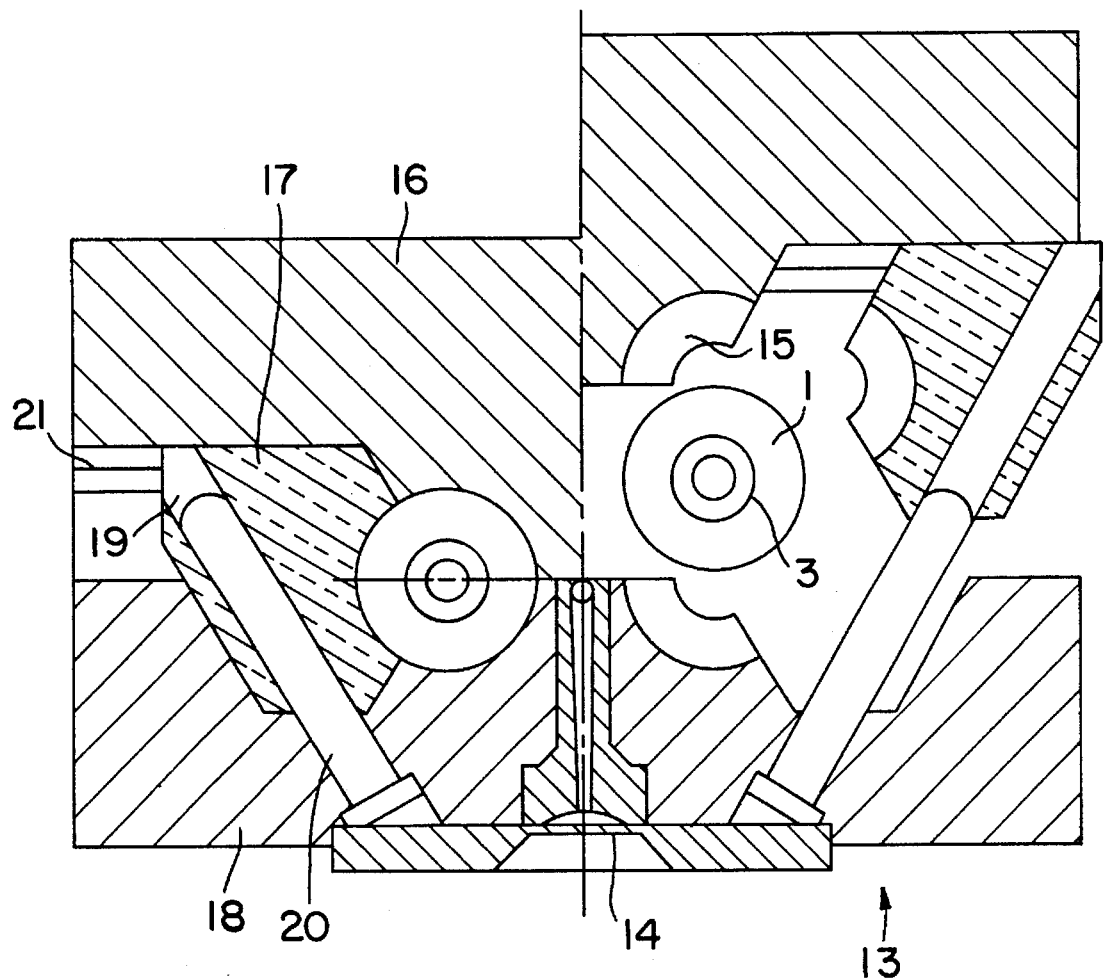
FIG. 7 shows a casting mould for use in a method for making a hose according to the invention.

FIG. 7 illustrates a section through a die casting mould 13 for use in a method for making a hose 3, which with even intervals is provided with hose protectors 1. The casting mould 13 of the embodiment shown for a tripartite mould, made for simultaneously containing two parallel led hoses 3, which are pre-fabricated, and which subsequently are provided with the hose protectors 1. At the left side, the mould is shown closed and at the right side, the mould is shown open. It is preferred to use a tripartite mould instead of a bipartite mould as there is the risk of squeezing occurring in the hose in the immediate connection of the axial end portions 5',6' of a hose protector 1. Such a squeezing may result in a rupture in the outer protecting layer of the hose 3, and thereby making the hose useless within the food industry.

The die casting mould 13 comprises an inlet 14 supplying two mould cavities 15, which has a form like the hose protector 1 desired to be made.

Two pre-fabricated hoses are gradually led through the mould and pass straight through the mould cavities 15. When the hoses are led through to a position in which a hose protector is to be moulded, the mould 13 is closed as illustrated at the left half of FIG. 7. In this situation the two moving form parts 16,17 of the mould are led against the fixed form part 18 of the mould 13. The movable form part 17 is displaced at an angle as the form part through a passage 19 is guided by a pin 20, which is mounted in the fixed form part 18. The movable form part 17 cooperates with the movable form part 16 through a guide 21.

After a hose protector 1 is moulded and sufficiently cooled, the mould is opened as illustrated at the right side of FIG. 7, after which the hose 3 with the thereupon firmly mounted hose protector 1 is displaced out of the mould, and is displaced across such a length that the following hose protector 1 may be moulded around the portion of the hose 3, which now is situated in the mould cavities 15. Subsequently, the mould 13 is closed, and the above-described method is repeated.

Alternatively, the hose protectors may be moulded continuously, but with spacings on the hose during its production or at least during the production of the outermost layer on the hose 3.

In an example of a hose according to the invention, the plastic used for hose protectors was nylon. The hose was a ⅜ inch hose, and the hose protector was made with a greatest outer diameter of approximately 40 mm. During the production the mould was closed for approximately 30 seconds. The mutual distance between the hose protector was approximately 400 mm, which ensured that the hose rested only on the hose protectors against the base.

As mentioned above, a hose provided with hose protectors is advantageous when water is to be drained from a surface. The hose according to the invention is especially advantageous when foaming water is in question, which with difficulty is drained when an ordinary hose rests on the surface.

Besides, the water hoses mentioned above, the invention will also be advantageous in connection with any type of service wires, whether they are used for individual or combined transportation of air, electricity, and/or water, e.g. as those known from service wires at airports, from compressor hoses, electric cables at building sites, welding cables, etc. Even though the invention offers special advantages for water hoses within the food industry, it is not limited solely to hoses within this field.

We claim:

1. A protector for use with a hose having a certain outside diameter, said protector comprising:

a solid annular body providing an interior surface which extends from a first end thereof to a second end thereof and defines a central passage therethrough, and an exterior surface which extends from said first end to said second end, said interior surface at said first and second ends having a diameter which substantially equals said certain outside diameter, such that said protector can sealingly engage said hose when said hose is extended through said central passage, and said exterior surface provides a first portion which gradually expands in diameter from juncture with said interior wall at said first end of said solid annular body to a central second portion of largest diameter, and a third portion which gradually contracts in diameter from said second portion to juncture with said interior wall at said second end of said solid annular body.

2. A protector according to claim 1, wherein said first portion of said exterior surface is frustoconical, wherein said second portion is cylindrical, and wherein said third portion is frustoconical.

3. A protector according to claim 1, wherein said solid annular body is composed of first and second halves and includes means for locking said first and second halves together.

4. A protector according to claim 3, wherein said first and second halves are identical.

5. A protector according to claim 1, wherein said protector is made of plastic.

6. A protector according to claim 1, wherein said interior surface defines an imaginary central axis and wherein said frustoconical first and third exterior surface portions extend at an angle of about 10° to 45° relative to said central axis.

7. The combination of a hose having a length and a certain outside diameter and a plurality of protectors sealingly positioned around the hose at spaced locations along said length thereof to reduce friction and wear, each said protector comprising:

a solid annular body providing an interior surface which extends from a first end thereof to a second end thereof and defines a central passage therethrough, and an exterior surface which extends from said first end to said second end, said interior surface at said first and second ends having a diameter which substantially equals said certain outside diameter of said hose, such that said protector sealingly engages said hose, and said exterior surface provides a first portion which gradually expands in diameter from juncture with said interior wall at said first end to a central second portion of largest diameter, and a third portion which gradually contracts in diameter from said second portion to juncture with said interior wall at said second end of said solid annular body.

* * * * *